United States Patent [19]
Mülhaupt et al.

[11] Patent Number: 5,140,069
[45] Date of Patent: Aug. 18, 1992

[54] TOUGH EPOXY CASTING RESINS BASED ON POLYBUTADIENE-POLYOXYALKLENEGLYCOL COPOLYMERS

[75] Inventors: Rolf Mülhaupt, Freiburg, Fed. Rep. of Germany; Werner Rüfenacht, Marly, Switzerland

[73] Assignee: Ciba-Geigy Corporation, Ardsley, N.Y.

[21] Appl. No.: 481,424

[22] Filed: Feb. 16, 1990

[30] Foreign Application Priority Data

Feb. 24, 1989 [CH] Switzerland .................... 674/89

[51] Int. Cl.$^5$ .................... C08L 9/02; C08L 63/02; C08L 71/02
[52] U.S. Cl. .................... 525/109; 525/111; 525/113; 525/114; 525/404; 525/407; 525/482; 525/507; 528/103; 528/110; 528/111; 528/297
[58] Field of Search ................ 525/109, 111, 113, 114, 525/507, 482; 528/110, 111, 103, 297

[56] References Cited

U.S. PATENT DOCUMENTS

| | | | |
|---|---|---|---|
| 3,280,077 | 10/1966 | Case et al. | 525/438 |
| 4,055,541 | 10/1977 | Riew | 427/386 |
| 4,088,708 | 5/1978 | Riew | 526/335 |
| 4,129,670 | 12/1978 | Riew | 528/113 |
| 4,788,233 | 11/1988 | Sakakibara et al. | 523/400 |
| 5,073,601 | 12/1991 | Mulhaupt et al. | 525/109 |

FOREIGN PATENT DOCUMENTS 0169066 1/1986 European Pat. Off. .
2447036 4/1976 Fed. Rep. of Germany .
52-24287 2/1977 Japan .

OTHER PUBLICATIONS

C.A. 109: 130281x (1988).

*Primary Examiner*—John C. Bleutge
*Assistant Examiner*—Frederick Krass
*Attorney, Agent, or Firm*—JoAnn Villamizar

[57] ABSTRACT

Curable compositions containing
A) an epoxy resin having on average more than one epoxy group per molecule,
B) a carboxylic anhydride curing agent for component A) and
C) about 5 to 40% by weight, relative to the amount of the components A), B) and C), of a liquid mixture of C1) a polyalkylene glycol based on polypropylene glycol or polybutylene glycol having two to about six hydroxyl, carboxyl, carboxylic anhydride or glycidyl end groups and of C2) an elastomeric copolymer based on butadiene, a polar, ethylenically unsaturated comonomer and, if appropriate, further ethylenically unsaturated comonomers having carboxylic acid, hydroxyl, mercapto or glycidyl ether end groups are described. Components C1) and C2) can also occur together in a segmented copolymer.

8 Claims, No Drawings

TOUGH EPOXY CASTING RESINS BASED ON POLYBUTADIENE-POLYOXYALKLENEGLYCOL COPOLYMERS

The present invention relates to novel castable epoxy resin compositions and to the cured products obtainable therefrom.

Additives for modifying epoxy resins are already known. Thus, for example, DE-A 2,631,108 describes elastopolymer compositions which are curable and castable at room temperature and contain a non-cycloaliphatic epoxy resin and a selected liquid amine-terminated polymer, such as a butadiene/acrylonitrile rubber. These compositions are resistant to hydrolysis and generally require no additional crosslinking agent.

Compositions of matter containing a cycloaliphatic epoxy resin, a selected liquid amine-terminated polymer, such as a butadiene/acrylonitrile rubber, and an anhydride are described in DE-A 2,706,693. These mixtures can be cured to produce a thermoplastic, elastomeric intermediate state and can then be converted via a molten state into a heat-cured, elastomeric, tack-free end product.

The preparation of rubber-elastic mouldings is described in DE-A 2,447,036. The process disclosed therein is characterized by the casting and curing of compositions containing a polyether having an average molecular weight of 1,000 and 20,000, a 1,2-dicarboxylic anhydride, a bis-epoxide and, if appropriate, a polar, high-molecular rubber.

Improving the incorporation of synthetic rubber in epoxy resins by using a nonionic or anionic surface-active agent is suggested in DE-A 3,740,183. This enables the rubber to be dispersed uniformly and permanently in the epoxy resin, which results in improved processability, and products having a low fluctuation in peel strength can be obtained.

According to EP-A 169,066 combinations of glycidyl ethers and amino-terminated aliphatic polyethers can be modified by adding a combination of a polymeric toughening agent and a curing catalyst in such a way that rapidly curable compositions are obtained which can be converted into cured products having a high tensile shear strength and a high peel strength.

It has been found that the use of polyethers in epoxy resins often results in reduced strength properties, such as tensile strength, tensile shear strength and flexural strength, in the cured products. Furthermore, the modulus of elasticity and the glass transition temperature of the cured products are, as a rule, reduced. Loss of strength can, as a rule, be avoided by adding butadiene elastomers. However, additives of this type frequently result in an undesirable increase in the viscosity of the curable mixture, and the impact strength and fracture toughness of the cured products as a rule leave something to be desired.

Castable and heat-curable epoxy compositions of increased toughness which can be processed to give cured products of high strength and high glass transition temperatures are provided by the invention. The compositions according to the invention are distinguished particularly by surprisingly high impact strength and fracture toughness and by high values of elongation at break.

The invention relates to curable compositions comprising

A) an epoxy resin having on average more than one epoxy group per molecule,
B) a carboxylic anhydride curing agent for component A) and
C) about 5 to 40% by weight, relative to the amount of the components A), B) and C), of a liquid mixture of C1) a polyalkylene glycol based on polypropylene glycol or polybutylene glycol having two to about six hydroxyl, carboxyl, carboxylic anhydride or glycidyl end groups and of C2) an elastomeric copolymer based on butadiene, a polar, ethylenically unsaturated comonomer and, if appropriate, further ethylenically unsaturated comonomers having carboxylic acid, hydroxyl, mercapto or glycidyl ether end groups.

The polyalkylene glycol and the elastomeric copolymer can also occur together in a segmented copolymer. This embodiment is preferred, since as a rule it enables even higher toughness values to be achieved in the cured product without significant losses in strength.

The invention also relates, therefore, to curable compositions comprising

A) an epoxy resin having on average more than one epoxy group per molecule,
B) a carboxylic anhydride curing agent for component A) and
C) about 5 to 40% by weight, relative to the amount of the components A), B) and C), of a liquid, segmented copolymer having hydroxyl, carboxyl, carboxylic anhydride or glycidyl end groups and containing at least one block derived from a polyalkylene glycol based on polypropylene glycol or polybutylene glycol and at least one block derived from an elastomeric copolymer based on butadiene, a polar, ethylenically unsaturated comonomer and, if appropriate, further ethylenically unsaturated comonomers, the said blocks being attached via identical or different functional groups —CO—X— or —Y—CH$_2$—CH(OH)—CH$_2$—O— in which X is —O—, —S— or —NR$_1$—, Y is —O—, —S—, —NR$_1$— or —CO—O— and R$_1$ is hydrogen, alkyl, cycloalkyl, aryl or aralkyl.

As alkyl, R$_1$ can be linear or branched. Linear C$_1$–C$_6$alkyl, in particular methyl, is preferred. As cycloalkyl, R$_1$ preferably has 5 or 6 ring carbon atoms. It is preferably cyclohexyl. As aryl, R$_1$ is preferably a mononuclear or dinuclear carbocyclic-aromatic radical, in particular phenyl. As aralkyl, R$_1$ is preferably a radical containing a mononuclear carbocyclic-aromatic radical, in particular benzyl.

Virtually any epoxide resin having on average at least two 1,2-epoxide groups per molecule is suitable as the component A) in the compositions according to the invention. The following are examples of these:

I) polyglycidyl and poly-($\beta$-methylglycidyl) esters which can be obtained, for example, by reacting a compound containing at least two carboxyl groups in the molecule with epichlorohydrin, glycerol dichlorohydrin or $\beta$-methyl epichlorohydrin in the presence of bases. Examples of compounds having at least two carboxyl groups in the molecule are saturated aliphatic dicarboxylic acids, such as oxalic acid, malonic acid, succinic acid, $\alpha$-methylsuccinic acid, glutaric acid, adipic acid, pimelic acid, azelaic acid, sebacic acid or dimerized linoleic acid; or unsaturated aliphatic dicarboxylic acids, such as maleic acid, mesaconic acid, citraconic acid, glutaconic acid or itaconic acid; or cycloaliphatic dicarboxylic acids, such as hexahydrophthalic, hexahydroisophthalic or hexahydroterephthalic acid or tetrahydrophthalic, tetrahydroisophthalic or tetrahydroterephthalic acid or 4-methyltetrahydrophthalic acid, 4-methylhexahydrophthalic acid or endomethylenetetrahydrophthalic acid; or aromatic dicarboxylic acids, such as phthalic, isophthalic or terephthalic acid; or copolymers of (meth)acrylic acid with copolymerizable vinyl monomers, for example the 1:1 copolymers of methacrylic acid with styrene or with methyl methacrylate. Examples of tricarboxylic and higher carboxylic acids are especially aromatic tricarboxylic or tetracarboxylic acids, such as trimellitic acid, trimesic acid, pyromellitic acid or benzophenonetetracarboxylic acid, and also dimerized or trimerized fatty acids such as are available commercially, for example, under the name Pripol ®.

II) Polyglycidyl and poly-($\beta$-methylglycidyl) ethers which can be obtained, for example, by reacting a compound containing at least two alcoholic hydroxyl groups and/or phenolic hydroxyl groups in the molecule with epichlorohydrin, glycerol dichlorohydrin or $\beta$-methyl epichlorohydrin under alkaline conditions or in the presence of an acid catalyst with subsequent treatment with alkali. Examples of compounds having at least two alcoholic hydroxyl groups and/or phenolic hydroxyl groups in the molecule are aliphatic alcohols, such as ethylene glycol, diethylene glycol and higher poly-(oxyethylene) glycols, propane-1,2-diol, propane-1,3-diol or higher poly-(oxypropylene) glycols, butane-1,4-diol or higher poly-(oxybutylene) glycols, pentane-1,5-diol, neopentyl glycol (2,2-dimethylpropanediol), hexane-1,6-diol, octane-1,8-diol, decane-1,10-diol or dodecane-1,12-diol; hexane-2,4,6-triol, glycerol, 1,1,1-trimethylolethane, 1,1,1-trimethylolpropane, pentaerythritol, sorbitol or polyepichlorohydrins; or cycloaliphatic alcohols, such as 1,3-dihydroxycyclohexane, 1,4-dihydroxycyclohexane, 1,4-cyclohexanedimethanol, bis-(4-hydroxycyclohexyl)-methane, 2,2-bis-(4-hydroxycyclohexyl)-propane or 1,1-bis-(hydroxymethyl)-cyclohex-3-ene; or alcohols containing aromatic groups, such as N,N-bis-(2-hydroxyethyl)-aniline or p,p'-bis-(2-hydroxyethylamino)-diphenylmethane; or mononuclear or polynuclear polyphenols, such as resorcinol, hydroquinone, bis-(4-hydroxyphenyl)-methane, 2,2-bis-(4-hydroxyphenyl)-propane, brominated 2,2-bis-(4-hydroxyphenyl)-propane, bis-(4-hydroxyphenyl) ether, bis-(4-hydroxyphenyl) sulfone, 1,1,2,2-tetrakis-(4-hydroxyphenyl)-ethane or novolaks which are obtainable by the condensation of aldehydes, such as formaldehyde, acetaldehyde, chloral or furfuraldehyde, with phenols which are unsubstituted or substituted by alkyl or halogen, such as phenol, the bisphenols described above, 2-methylphenol, 4-methylphenol, 4-tert-butylphenol, p-nonylphenol or 4-chlorophenol.

III) Poly-(N-glycidyl) compounds which can be prepared, for example, by dehydrochlorinating reaction products of epichlorohydrin with amines containing at least two amino hydrogen atoms. Examples of amines on which such epoxy resins are based are aliphatic amines, such as hexamethylenediamine or n-butylamine; cycloaliphatic amines, such as 1,4-diaminocyclohexane or bis-aminomethylene-1,4-cyclohexane; aromatic amines, such as aniline, p-toluidine, bis-(4-aminophenyl)-methane, bis-(4-aminophenyl) ether, bis-(4-aminophenyl) sulfone, 4,4'-diaminobiphenyl or 3,3'-diaminobiphenyl; or araliphatic amines, such as m-xylylenediamine. The poly-(N-glycidyl) compounds also include, however, triglycidyl isocyanurate, N,N'-diglycidyl derivatives of cycloalkyleneureas, such as ethyleneurea or 1,3-propyleneurea, and N,N'-diglycidyl derivatives of hydantoins, such as 5,5-dimethylhydantoin.

IV) Poly-(S-glycidyl) compounds, for example di-S-glycidyl derivatives derived from dithiols, such as ethane-1,2-dithiol or bis-(4-mercaptomethylphenyl) ether.

V) Cycloaliphatic epoxy resins or epoxidation products of dienes or polyenes, such as cycloaliphatic epoxy resins which can be prepared, for example, by epoxidation of ethylenically unsaturated cycloaliphatic compounds. Examples of these are 1,2-bis-(2,3-epoxycyclopentyloxy)-ethane, 2,3-epoxycyclopentyl glycidyl ether, diglycidyl cyclohexane-1,2-dicarboxylate, 3,4-epoxycyclohexyl glycidyl ether, bis-(2,3-epoxycyclopentyl) ether, bis-(3,4-epoxycyclohexyl) ether, 5(6)-glycidyl-2-(1,2-epoxyethyl)-bicyclo[2.2.1]heptane, dicyclopentadiene dioxide, cyclohexa-1,3-diene dioxide, 3,4-epoxy-6-methylcyclohexylmethyl 3',4'-epoxy-6'-methylcyclohexanecarboxylate or 3,4-epoxycyclohexylmethyl 3',4'-epoxycyclohexanecarboxylate. It is also possible, however, to use epoxy resins in which the 1,2-epoxy groups are attached to various heteroatoms or functional groups; such compounds include, for example, the N,N,O-triglycidyl derivative of 4-aminophenol, the N,N,O-triglycidyl derivative of 3-aminophenol, the glycidyl ether/glycidyl ester of salicylic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

Preferred components A) are cycloaliphatic epoxy resins, for example the compounds listed earlier in the text and polyglycidyl ethers, in particular diglycidyl ethers based on a bisphenol, such as bisphenol F or especially bisphenol A.

Components A) which are very particularly preferred are liquid diglycidyl ethers based on bisphenol A.

In general, all anhydride curing agents for epoxy resins are suitable as the component B) in the compositions according to the invention. These curing agents include anhydrides of aliphatic, cycloaliphatic, aromatic or araliphatic polycarboxylic acids, for example anhydrides of the polycarboxylic acids enumerated earlier in the text as components for the formation of polyglycidyl esters.

Preferred components B) are anhydrides of aliphatic, cycloaliphatic or aromatic dicarboxylic acids.

Anydrides of dicarboxylic acids or mixtures of these anhydrides which are liquid at temperatures below 40° C. are very particularly preferred. Anhydride curing agents of this type are known per se to those skilled in the art in the field of epoxide curing and are described, for example, in the "Epoxy Handbook" by Lee and Neville (McGraw Hill, 1967).

Specific examples of preferred anhydride curing agents B) are maleic anhydride, succinic anhydride, dodecylsuccinic anhydride, tetrahydrophthalic anhydride, hexahydrophthalic anhydride, hexachloroendomethylenetetrahydrophthalic anhydride, phthalic anhydride, pyromellitic dianhydride, benzophenone-3,3',4,4'-tetracarboxylic dianhydride, bicyclo[2.2.1]hept-5-ene-2,3-dicarboxylic anhydride (nadic anhydride) or methylbicyclo[2.2.1]hept-5-ene-2,3-dicarboxylic anhydride (methylnadic anhydride).

Component C) of the compositions according to the invention is either a combination of the components C1)

and C2) defined above or a segmented copolymer containing blocks based on these components C1) and C2).

Component C1) is a selected polyalkylene glycol based on polypropylene glycol or polybutylene glycol and having two to about six hydroxyl, carboxyl, carboxylic anhydride or glycidyl end groups. In general, these polymers have an average molecular weight (number average) of about 500 to 10,000, in particular between 1,000 and 5,000.

As a rule, the polyalkylene glycol segments have a minimum length of about five recurring structural units in order to impart adequate flexibility to the composition according to the invention. It is also possible for mixtures of different polypropylene glycols or polybutylene glycols within the compositions according to the invention or within a segmented copolymer C) to be present; components C1) or copolyether segments composed of polypropylene glycol and polybutylene glycol units can also be used. In this embodiment it is also possible for up to 30% by weight of ethylene glycol units to be co-condensed into the copolyether radical.

Hydroxyl-terminated polyalkylene glycols can be obtained, for example, by anionic polymerization, copolymerization or block copolymerization of propylene oxide or butylene oxide, if appropriate in combination with ethylene oxide, with difunctional or polyfunctional alcohols, such as, 1,2-ethanediol, 1,4-butanediol, 1,1,1-trimethylolethane, 1,1,1-trimethylolpropane, 1,2,6-hexanetriol, glycerol, pentaerythritol or sorbitol, or with difunctional or polyfunctional phenols, such as bisphenol A or novolaks, or with amines, such as methylamine, ethylenediamine or 1,6-hexamethylenediamine, as initiation components, or by cationic polymerization or copolymerization of cyclic ethers, such as tetrahydrofuran or propylene oxide, if appropriate together with ethylene oxide, using acid catalysts, such as $BF_3$ etherate, or by polycondensation of glycols which can be polycondensed with the elimination of water, such as 1,3-propanediol or 1,4-butanediol, in the presence of acid etherification catalysts, such as p-toluenesulfonic acid. It is also possible to use oxalkylation products of phosphoric or phosphorous acid with tetrahydrofuran or propylene oxide, if appropriate together with ethylene oxide. Polypropylene oxide oligomers can be terminated with ethylene oxide. Other hydroxyl-terminated polyalkylene glycols can be obtained, for example, by masking hydroxyl-terminated or amino-terminated polypropylene glycols or polybutylene glycols with aromatic hydroxycarboxylic acids, for example hydroxybenzoic acid.

Carboxyl-terminated or carboxylic anhydride-terminated components C1) can be obtained, for example, by masking hydroxyl-terminated polypropylene glycols or polybutylene glycols with polycarboxylic acids, anhydrides thereof or other ester-forming derivatives. Examples of possible masking components are the polycarboxylic acids enumerated earlier in the text as components for the formation of polyglycidyl esters.

Glycidyl-terminated components C1) can be prepared, for example, by reacting hydroxyl-terminated polypropylene glycols or polybutylene glycols with epichlorohydrin or β-methyl epichlorohydrin in the manner described earlier in the text in regard to the preparation of glycidyl ethers. In addition, polypropylene glycols or polybutylene glycols which are terminated with aromatic hydroxycarboxylic acids can be glycidylated in the manner described above.

Preferred components C1) are trihydric and particularly dihydric carboxyl-terminated, carboxylic anhydride-terminated, glycidyl-terminated and especially hydroxyl-terminated polypropylene glycols or polybutylene glycols. The average molecular weights (number average) of these preferred components C1) are between 500 and 5,000, in particular between 1,000 and 2,500.

Components C1) which are very particularly preferred are compounds of the formulae I to V

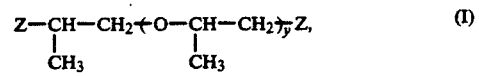 (I)

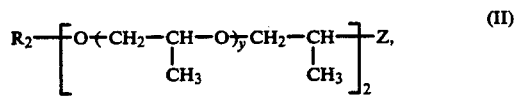 (II)

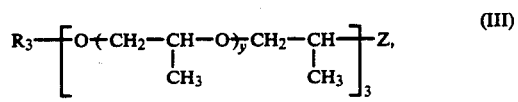 (III)

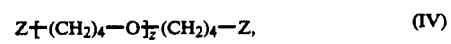 (IV)

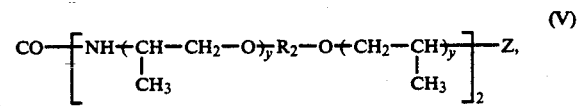 (V)

in which y is 5 to 90, in particular 10 to 90, z is 10 to 40, $R_2$ is a radical of an aliphatic diol or bisphenol after the two OH groups have been removed, $R_3$ is a radical of an aliphatic triol or trisphenol after the three OH groups have been removed and Z is a radical selected from the group consisting of

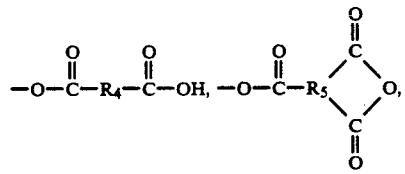

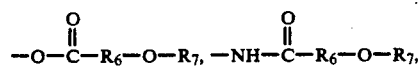

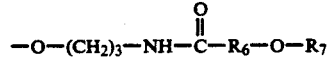

and $-O-R_7$, in which $R_4$ is the radical of an aliphatic, cycloaliphatic or aromatic dicarboxylic acid after the two carboxyl groups have been removed, $R_5$ is the radical of an aromatic tricarboxylic acid after the three carboxyl groups have been removed, $R_6$ is the radical of an aromatic hydroxycarboxylic acid after the carboxyl group and the phenolic hydroxyl group have been removed and $R_7$ is hydrogen or a group of the formula

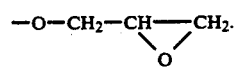

Examples of $R_4$ as aliphatic, cycloaliphatic or aromatic dicarboxylic acids are listed earlier in the text as components for the formation of glycidyl esters A).

R4 is preferably an unbranched C2–C12alkylene radical, an unsubstituted or methyl-substituted phenylene radical or an unsubstituted naphthalene radical.

R5 is preferably a radical of trimesic acid or especially a radical of trimellitic acid.

R6 is preferably an unsubstituted or methyl-substituted phenylene radical or an unsubstituted naphthalene radical.

Any desired elastomeric carboxyl-terminated, hydroxyl-terminated, mercapto-terminated or glycidyl ether-terminated copolymers based on butadiene, a polar, ethylenically unsaturated comonomer and, if appropriate, further ethylenically unsaturated comonomers can be used as component C2) of the compositions according to the invention.

Examples of polar, ethylenically unsaturated comonomers for the preparation of component C2) are acrylic acid, methacrylic acid, esters of acrylic or methacrylic acid, for example the methyl or ethyl esters, amides of acrylic or methacrylic acid, and also fumaric acid, itaconic acid, maleic acid or esters and half-esters thereof or maleic anhydride or itaconic anhydride; vinyl esters, for example vinyl acetate; polar styrenes, such as styrenes chlorinated or brominated in the nucleus; or methacrylonitrile or, in particular, acrylonitrile.

As well as polar, ethylenically unsaturated comonomers, further non-polar, ethylenically unsaturated comonomers can also be employed for the preparation of component C2). Examples of these are ethylene, propylene or especially styrene or substituted styrenes, such as vinyltoluene.

Component C2) can be statistical copolymers, block copolymers or graft copolymers. This component can be solid, especially pulverulent, or liquid, provided that a liquid mixture can be prepared with it in combination with component C1). In general, component C2) is an elastomer or a thermoplastic elastomer. It is very particularly preferable for component C2) to be a liquid elastomer.

The average molecular weights (number average) of the preferred liquid butadiene copolymers are, in general, 500–10,000, in particular 1,000–5,000.

Preferred components C2) are carboxyl-terminated, hydroxyl-terminated, mercapto-terminated or glycidyl ether-terminated, liquid, elastomeric copolymers based on butadiene and acrylonitrile. Examples of such compounds are rubbers of the Hycar ® type made by B.F. Goodrich.

Carboxyl-terminated or carboxylic anhydride-terminated components C2) can also be obtained by masking hydroxyl-terminated butadiene copolymers C2) with polycarboxylic acids, anhydrides thereof or other ester-forming derivatives. Examples of possible masking components are the polycarboxylic acids enumerated earlier in the text as components for the formation of polyglycidyl esters.

Glycidyl-terminated components C2) can also be prepared by reacting hydroxyl-terminated butadiene copolymers C2) with epichlorohydrin or β-methyl epichlorohydrin in the manner described earlier in the text in regard to the preparation of glycidyl ethers.

Preferred types of liquid butadiene elastomers C2) contain the structural elements of the formulae VIa to VId and the end groups Q —CH2—CH=CH—CH2—, (VIa)

in which R8 is hydrogen or methyl, R9 is —COOH, —COOR10 or —CONH2, R10 is an aliphatic radical, preferably methyl, and Q is selected from the group consisting of —R11—COOH and —R11—OH in which R11 is an alkylene or arylene radical; the proportion of the radicals VIa and VIb is preferably 5 to 50% by weight, the proportion of the radicals VIc is preferably 5–50% by weight and the proportion of the radicals VId is preferably 0–10% by weight, the figures relating to the total amount of the radicals VIa to VId.

In general, the acrylonitrile content of the preferred liquid butadiene copolymers is less than 50% by weight, in particular 8 to 30% by weight, relative to the total monomer content.

Component C2) can also be employed in the form of an adduct, onto an epoxy resin, of a butadiene/acrylonitrile copolymer containing the functional groups, described above, reactive towards epoxy groups.

The preparation of such adducts is effected in a manner known per se by heating the reactive butadiene elastomer and the epoxy resin, if appropriate with a catalyst, such as triphenylphosphine, a tertiary amine, a tertiary ammonium or phosphonium salt or chromium acetylacetonate, so that a fusible, but still curable, precondensate is formed.

The proportion of the comonomers to one another in component C2) can vary within wide ranges. This component is so selected that it is compatible with the epoxy resin A) and the curing agent B). In this regard it is generally necessary for the difference between the solubility parameters of the constituents of the mixture to be less than 1.0, in particular less than 0.6. Solubility parameters of this type can be calculated, for example, by Small's method [J. Appl. Chem., 3, 71 (1953)]. The use of solubility parameters in determining the compatibility of polymer mixtures has been described, for example, by C. B. Bucknall in "Toughened Plastics", chapter 2, Applied Science Publishers Ltd., London, 1977.

Components C) which are very particularly preferred are segmented copolymers having hydroxyl, carboxyl, carboxylic anhydride or glycidyl end groups containing blocks based on the components C1) and C2), which are attached to one another via the functional groups defined earlier in the text.

These copolymers generally have an average molecular weight (number average) of 1,000 to 20,000, preferably 3,000 to 10,000.

Segmented copolymers C) which are attached to one another via —CO—X— groups can be obtained by reacting carboxyl-terminated or carboxylic anhydride-terminated components C1) with hydroxyl-terminated, mercapto-terminated or amino-terminated components C2) or by reacting hydroxyl/terminated, mercapto-terminated or amino-terminated components C1) with carboxyl-terminated or carboxylic anhydride-terminated components C2).

Segmented copolymers C) which are attached to one another via —Y—CH$_2$—CH(OH)—CH$_2$—O— groups can be obtained by reacting carboxyl-terminated, carboxylic anhydride-terminated, hydroxyl-terminated, mercapto-terminated or amino-terminated components C1) with glycidyl ether-terminated components C2) or by reacting glycidyl ether-terminated components C1) with carboxyl-terminated, carboxylic anhydride-terminated, hydroxyl-terminated, mercapto-terminated or amino-terminated components C2).

In these reactions the proportions of the reactants are generally so chosen that the reactive groups of one of the components is essentially consumed by the reaction, whereas the reactive groups of the other component are in part preserved, and form the end groups of the component C) or are converted into the end groups according to the definition by masking with a masking agent.

In general, the reactions are carried out by heating the components for the formation of the segmented copolymers in the presence or absence of an inert solvent.

Depending on the functionality of these components, the components C1) and C2) to be reacted with one another are so chosen that a segmented copolymer which is liquid at temperatures up to about 40° C. is obtained. Thus, if a difunctional component is present, another component of higher functionality can be used, whereas combinations of several polyfunctional components as a rule result in excessive crosslinking and the formation of gels. The criteria of selection for the preparation of the component C) to the specification indicated above are known per se to those skilled in the art in the field of polymerization.

The carboxyl-terminated, carboxylic anhydride-terminated, hydroxyl-terminated, mercapto-terminated, glycidyl ether-terminated or amino-terminated starting materials for the preparation of the segmented copolymers C) are known per se or can be obtained by processes known per se.

The preparation of carboxyl-terminated, carboxylic anhydride-terminated, hydroxyl-terminated or glycidyl ether-terminated polyalkylene glycols is described earlier in the text in regard to the preparation of component C1).

Amino-terminated polyalkylene glycols are derived, for example, from the hydroxyl-terminated polyalkylene glycols described above by reacting compounds of this type containing primary hydroxyl groups, for example polybutylene glycol, with acrylonitrile and then hydrogenating the products, or by reacting compounds of this type containing secondary hydroxyl groups with ammonia. Suitable amino-terminated polypropylene glycols are the products obtainable commerically under the name "Jeffamine ®" from Texaco.

Mercapto-terminated polyalkylene glycols can be obtained, for example, by reacting the corresponding hydroxyl-terminated or amino-terminated polyalkylene glycols with mercaptocarboxylic acids or esters thereof, such as mercaptoacetic acid (esters), or by adding on episulfides onto hydroxyl-terminated or amino-terminated polyalkylene glycols.

The preparation of carboxyl-terminated, carboxylic anhydride-terminated, hydroxyl-terminated or glycidyl ether-terminated butadiene copolymers is described earlier in the text in regard to the preparation of component C2). Mercapto-terminated and amino-terminated butadiene copolymers are in part commerically available and can be prepared analogously to the polyalkylene glycol derivatives by masking hydroxyl-terminated derivatives.

Preferred segmented polymers C) are derived from essentially difunctional components C1) and C2).

Segmented copolymers C) which are very particularly preferred are compounds containing blocks derived from liquid butadiene/acrylonitrile copolymers and containing blocks derived from difunctional polybutylene glycols or from trifunctional, or especially difunctional, polypropylene glycols.

It is very particularly preferable to use segmented copolymers C) of the formula VI

$$Z\text{---}[\text{PAG}\text{---}X_1\text{---}BDC]_n X_1\text{---}PAG\text{---}Z \qquad (VI),$$

in which n is an integer from 1 to 10, in particular 1, PAG is the radical of a difunctional polypropylene glycol or polybutylene glycol after the functional groups have been removed, BDC is the radical of a difunctional liquid butadiene/acrylonitrile copolymer after the functional groups have been removed, $X_1$ is a bridge group of the formulae —CO—X— and/or —X—CO— or —Y—CH$_2$—CH(OH)—CH$_2$—O— and/or —O—CH$_2$—CH(OH)—CH$_2$—Y— in which X, Y and the end groups Z are as defined above.

Components A), B) and C) in the compositions according to the invention should be compatible with one another. In general, these components are so selected that no visible phase separation takes place in the curable mixture. Components B) and C) should dissolve in the epoxy resin A) at least at an elevated temperature. Components A), B) and C) are preferably so selected that a multi-phase system is formed when the composition is cured.

In order to achieve products having a high strength, glass transition temperature, peel strength, impact strength and resistance to crack propagation (fracture toughness), the proportion of the component C), relative to the amount of A), B) and C), will generally not exceed 40% by weight. The lower limit depends on the desired properties, for example the peel strength. As a rule, component C) should make up more than 5% by weight, preferably more than 10% by weight. Compositions having a content of the component C) of about 10 to about 30% by weight, relative to the amount of A), B) and C), are preferred.

The ratio by weight of C1) to C2) or the ratio by weight of the polyalkylene glycol segments and the elastomeric copolymer segments in the copolymer C) can be varied within wide ranges. The preferred range for C1) to C2) or for the polyalkylene glycol segments to the elastomeric copolymer segments is 50:1 to 1:50, in particular 5:1 to 1:5.

The amount of the curing agent B), relative to the epoxy resin A), generally depends on the type of curing agent used and is known per se to those skilled in the art. As a rule the amounts of component B) employed will be such that there is about 0.7 to 0.8 of anhydride groups of the curing agent to one epoxy group.

If appropriate, the compositions according to the invention also contain a curing accelerator D). As a rule, the nature and amount of the component D) depend on the type of curing agent used and are known per se to those skilled in the art in the field of epoxide curing. Details are to be found in the "Epoxy Handbook" by Lee and Neville (McGraw Hill, New York 1967). The preferred curing accelerators are tertiary amines, such as benzyldimethylamine.

The compositions according to the invention can be prepared by mixing their components in the devices customary for this process.

The curing temperatures of the compositions according to the invention are preferably between 80° and 280° C., particularly preferably between 100° and 200° C.

If desired, curing can also be carried out in two stages, for example by interrupting the curing process or by allowing the curable mixture to cure in part at fairly low temperatures. The products obtained in this way are pre-condensates which are still fusible and soluble (so-called "B-stage resins") and are suitable for use, for example, as compression moulding materials or sintering powders or for the production of prepregs.

If desired, reactive thinners, for example styrene oxide, butyl glycidyl ether, 2,2,4-trimethylpentyl glycidyl ether, phenyl glycidyl ether, cresyl glycidyl ether or glycidyl esters of synthetic, highly branched, principally tertiary, aliphatic monocarboxylic acids can be added to the curable mixtures to lower the viscosity. Further customary additives which can also be present in the mixtures according to the invention are plasticizers, extenders, fillers and reinforcing agents, for example coal tar, bitumen, textile fibres, glass fibres, asbestos fibres, boron fibres, carbon fibres, mineral silicates, mica, quartz powder, hydrated aluminium oxide, bentonites, wollastonite, kaolin, silica aerogel or metal powders, for example aluminium powder or iron powder, and also pigments and dyes, such as carbon black, oxide colours and titanium dioxide, and also fire-retarding agents, thixotropic agents, flow control agents (which can in some cases also be used as mould release agents), such as silicones, waves and stearates, or adhesion promoters, antioxidants and light stabilizers.

The compositions according to the invention can be employed very generally as casting resins for the production of cured products, and can be used in the formulation suited to the particular field of application, for example as adhesives, matrix resins, electrical casting resins or surface coating agents.

The curable compositions according to the invention are liquid at room temperature as a rule. They can in every case be cast at temperatures of 40° C.

The curable compositions according to the invention are particularly suitable for casting and encapsulating electrical and electronic components or for the production of composite materials.

The invention also relates to the use of the curable mixtures for the purposes mentioned above.

The cured products are distinguished by the advantageous and surprising properties described initially. The invention therefore also relates to the products obtainable by heating the compositions according to the invention.

The following examples illustrate the invention.

I. PREPARATION OF THE POLYMER COMPONENT C)

I.1. Prepolymer 1

A mixture of 730 g of bisphenol A diglycidyl ether (epoxide content 5.4 equivalents/kg), 200 g of carboxyl-terminated acrylonitrile/butadiene copolymer (26% acrylonitrile content, acid number 32 mg of KOH/g), 64 g of bisphenol A and 5 g of triphenylphosphine is heated at 130° C. for 3 hours until a viscous resin having an epoxide content of 3.3 equivalents/kg and an Epprecht viscosity of 130,000 mPas (40° C.) has been formed.

I.2. Prepolymer 2

A mixture of 450 g of polypropylene glycol triol having a molecular weight $M_n$ of 4,500 (Baygal ® K390 made by Bayer AG) and 180 g of a carboxyl-terminated butadiene/acrylonitrile copolymer (26% acrylonitrile content, acid number 32 mg of KOH/g) is heated under a gentle stream of nitrogen at 220° C. for 8 hours, in the course of which water is distilled off. A resin having the following analytical data is obtained:

Viscosity (Epprecht): 6,400 mPas (25° C.);
Molecular weight (GPC, in THF): $M_n=7,700$, $M_w/M_n=1.4$.

I.3. Prepolymer 3

A mixture of 867 g of carboxyl-terminated butadiene/acrylonitrile copolymer (26% acrylonitrile content, acid content 35 mg of KOH/g) and 667 g of dihydroxyl-terminated polytetrahydrofuran of molecular weight $M_n=1,000$ is heated in a gentle stream of nitrogen at 220° C. for 8 hours, in the course of which water is distilled off. A resin having the following analytical data is obtained:

Viscosity (Epprecht): 66,560 mPas (25° C.);
Hydroxyl group content: 1.65% by weight;
Molecular weight (GPC, in THF): $M_n=4,750$, $M_w/M_n=3.7$.

I.4. Prepolymer 4

A mixture of 350 g of a polypropylene glycol diglycidyl ether (epoxide content: 2.5 equivalents/kg), 936 g of a carboxyl-terminated butadiene/acrylonitrile copolymer (26% acrylonitrile content, acid content 35 mg of KOH/g) and 0.5 g of triphenylphosphine is heated at 140° C. for 7 hours, and a resin having the following analytical data is obtained:

Viscosity (Epprecht): 327,680 mPas (25° C.);
Molecular weight (GPC, in THF): $M_n=5,390$, $M_w/M_n=4.9$;
Epoxide content: 0.34 equivalents/kg.

I.5. Prepolymer 5

Dihydroxyl-terminated polytetrahydrofuran ($M_n=1,000$) is procured from BASF AG.

I.6. Prepolymer 6

Polypropylene glycol triol ($M_n=4,500$) is procured from Bayer AG under the tradename Baygal ® K390.

I.7. Prepolymer 7

The carboxyl-terminated butadiene/acrylonitrile copolymer containing 26% of acrylonitrile and having an acid number of 35 mg of KOH/g is procured from B.F. Goodrich as Hycar ® CTBN 1300X13.

I.8. Prepolymer 8

A mixture of 433 g of butadiene/acrylonitrile copolymer (26% acrylonitrile, acid number 32 mg of KOH/g), 500 g of the diglycidyl ether of polytetrahydrofuran (790 mPas at 25° C., epoxide content 1.2 equivalents/kg, number average molecular weight $M_n=1,280$) and 0.5 g of triphenylphoshine is heated at 150° C. for 2 hours and at 180° C. for 6 hours until a viscous resin having the following analytical data has been formed:

Viscosity (Epprecht): 76,800 mPas (25° C.);

Molecular weight (GPC in THF): $M_n=4,950$, $M_w/M_n=6.3$;
Epoxide content: 0.39 equivalents/kg.

I.9. Prepolymer 9

A mixture of 160 g of butadiene/acrylonitrile copolymer (26% acrylonitrile, acid number 32 mg of KOH/g) and 100 g of dihydroxyl-terminated polytetrahydrofuran having a molecular weight of 1,000 is heated under a gentle stream of nitrogen at 220° C. for 8 hours. A viscous resin having the following analytical data is obtained:
Hydroxyl group content: 0.67 equivalents/kg;
Viscosity (Epprecht): 261,120 mPas (25° C.);
Molecular weight (GPC in THF): $M_n=5,770$, $M_w/M_n=6.0$.

I.10. Prepolymer 10

A mixture of 100 g of butadiene/acrylonitrile copolymer (26% acrylonitrile, acid number 32 mg of KOH/g) and 125 g of dihydroxyl-terminated polytetrahydrofuran having a molecular weight of 2,000 is heated under a gentle stream of nitrogen at 220° C. for 8 hours until a viscous resin having the following analytical data has been formed:
Hydroxyl group content: 0.53 equivalents/kg;
Viscosity (Epprecht): 87,040 mPas (40° C.);
Molecular weight (GPC in THF): $M_n=6,470$, $M_w/M_n=5.7$.

I.11. Prepolymer 11

A mixture of 106.7 g of butadiene/acrylonitrile copolymer (26% acrylonitrile, acid number 32 mg of KOH/g) and 133.3 g of dihydroxyl-terminated polypropylene glycol having a molecular weight of $M_n=2,000$ is heated under a gentle stream of nitrogen at 220° C. for 8 hours until a viscous resin having the following analytical data has been formed:
Viscosity (Epprecht): 22,400 mPas (25° C.);
Molecular weight (GPC in THF): $M_n=6,800$, $M_w/M_n=5.5$.

I.12. Prepolymer 12

A mixture of 144.3 g of butadiene/acrylonitrile copolymer (18% acrylonitrile) and 111 g of dihydroxyl-terminated polytetrahydrofuran of molecular weight 1,000 is heated under a gentle stream of nitrogen at 220° C. until a viscous resin having the following analytical data has been formed:
Hydroxyl group content: 0.71 equivalents/kg;
Viscosity (Epprecht): 110,080 mPas (25° C.);
Molecular weight (GPC in THF): $M_n=5,650$, $M_w/M_n=5.9$.

I.13. Prepolymer 13

A mixture of carboxyl-terminated polybutadiene (available commercially from B.F. Goodrich as Hycar ® CTB 2000x162) and 111 g of a glycidylated polytetrahydrofuran (Epprecht viscosity 790 mPas at 25° C., 1.2 equivalents of epoxide/kg, $M_n=1,280$) is heated at 165° C. for 8 hours in the presence of 0.2 g of triphenylphosphine until a viscous resin having the following analytical data is obtained:
Epoxide content: 0.42 equivalents/kg;
Viscosity (Epprecht): 29,440 mPas (25° C.);
Molecular weight (GPC in THF): 2,670, $M_w/M_n=10.1$.

II. FORMULATIONS AND TESTS ON MATERIALS

Sheets 4 mm thick are prepared as described in Table I, a bisphenol A diglycidyl ether (epoxide content 5.4 equivalents/kg) together with the anhydride of methylbicyclo[2.2.1]hept-5-ene-2,3-dicarboxylic acid (methylnadic anhydride) being cured in the presence of catalytic amounts of benzyldimethylamine and various amounts of prepolymers I.1 to I.7. Curing is carried out for 6 hours at 150° C. Curable mixtures containing, as the component C), block copolymers (Examples II.1–II.5) or prepolymer blends (Examples II.6–II.9) are tested.

The following material tests are carried out:
Viscosity of the uncured mixture by Epprecht's method (mPas at 25° C.); glass transition temperature of the cured product determined by thermomechanical analysis (TMA) using the DuPont 9000 thermoanalysis instrument; tensile shear strength on degreased aluminium as specified in DIN 53,285; tensile strength as specified in DIN 53,455; elongation at break as specified in DIN 53,455; flexural strength as specified in DIN 53,452; edge fibre elongation as specified in DIN 53,452; impact strength (Charpy) as specified in DIN 53,453; fracture toughness $G_{Ic}$ in the bend notch test, the crack being initiated by means of a razor blade; modulus of elasticity from tensile test as specified in DIN 53,455; modulus of elasticity from flexural test as specified in DIN 53,452.

The quantity data in Table I below are parts by weight.

TABLE I

| Example No. | II.1. | II.2. | II.3. | II.4. | II.5. | II.6. | II.7. | II.8. | II.9. |
|---|---|---|---|---|---|---|---|---|---|
| Bisphenol A diglycidyl ether (Epoxide content: 5.4 eq./kg) | 100 | 100 | 100 | 100 | 100 | 100 | 100 | 100 | 100 |
| Methylnadic anhydride | 81.7 | 81.7 | 81.7 | 81.7 | 81.7 | 102.3 | 81.7 | 81.7 | 102.3 |
| Benzyldimethylamine | 3.6 | 3.6 | 3.6 | 3.6 | 3.6 | 4.0 | 3.6 | 3.6 | 4.0 |
| Prepolymer 1 | | | | | | 40 | | | 40 |
| Prepolymer 2 | 24 | 48 | 80 | | | | | | |
| Prepolymer 3 | | | | 48 | | | | | |
| Prepolymer 4 | | | | | 48 | | | | |
| Prepolymer 5 | | | | | | 40 | | | |
| Prepolymer 6 | | | | | | | 40 | 40 | 40 |
| Prepolymer 7 | | | | | | | 8 | 40 | |
| Viscosity at 25° C. (mPas) | 15,360 | 12,800 | 9,280 | 26,560 | 35,840 | 22,400 | 11,520 | 23,360 | 26,880 |
| $T_g$ (TMA) (°C.) | 119 | 117 | 92 | 84–108 | 107 | 83 | 100 | 23 + 83 | 111 |
| Tensile shear strength (N/mm²) | 18.5 | 18.2 | 15.2 | 24.7 | 23.5 | 19.0 | 20.3 | 18.0 | 19.7 |
| Tensile strength (N/mm) | 67.4 | 47.5 | 24.2 | 49.3 | 43.9 | 59.5 | 44.8 | 29.3 | 51.5 |
| Elongation at break (%) | 4.3 | 7.7 | 21.1 | 9.8 | 8.2 | 7.3 | 10.9 | 45.0 | 7.7 |

TABLE I-continued

| Example No. | Formulations tested | | | | | | | | |
|---|---|---|---|---|---|---|---|---|---|
|  | II.1. | II.2. | II.3. | II.4. | II.5. | II.6. | II.7. | II.8. | II.9. |
| Flexural strength (MPa) | 111.4 | 80.7 | 37.0 | 78.9 | 13.0 | 103.4 | 74.4 | 44.0 | 86.2 |
| Edge fibre elongation (%) | 6.6 | 12.4 | — | 12.6 | — | 12.8 | — | 12.6 | 10.6 |
| Impact strength (kJ/m$^2$) | 28.4 | 35.3 | 40.7 | 52.8 | 36.9 | 41.7 | 41.0 | 62.8 | 28.6 |
| Fracture toughness (kJ/m$^2$) | 0.91 | 1.14 | 1.09 | 1.93 | 1.78 | 0.66 | 0.55 | 0.9 | 0.82 |
| Modulus of elasticity (tensile) (N/mm$^2$) | 2444 | 1874 | 903 | 1833 | 1729 | 2407 | 1642 | 1002 | 1925 |
| Modulus of elasticity (flexural) (N/mm$^2$) | 2427 | 1837 | 894 | 1814 | 1799 | 2420 | 1711 | 1039 | 1946 |

What is claimed is:

1. A curable composition comprising
   A) an epoxy resin having on average more than one epoxy group per molecule,
   B) a carboxylic anhydride curing agent for component A) selected from an anhydride of aliphatic, cycloaliphatic or aromatic dicarboxylic acids and
   C) about 5 to 40% by weight, relative to the amount of the components A), B) and C), of a liquid, segmented copolymer having hydroxyl, carboxyl, carboxylic anhydride or glycidyl end groups and containing at least one block derived from a polyalkylene glycol based on polypropylene glycol or polybutylene glycol and at least one block derived from an elastomeric copolymer based on butadiene, a polar, ethylenically unsaturated comonomer and, optionally, further ethylenically unsaturated comonomers, the said blocks being attached via identical or different functional groups —CO—X— or —Y—CH$_2$—CH(OH)—CH$_2$—O— in which X is —O—, —S— or —NR$_1$—, Y is —O—, —S—, —NR$_1$— or —CO—O— and R$_1$ is hydrogen, alkyl, cycloalkyl, aryl or aralkyl.

2. A curable composition according to claim 1, wherein component A) is a cycloaliphatic epoxy resin or a polyglycidyl ether.

3. A curable composition according to claim 2, wherein component A) is a diglycidyl ether based on bisphenol.

4. A curable composition according to claim 3, wherein component A) is a liquid diglycidyl ether based on a bisphenol A.

5. A curable composition according to claim 1, wherein component B) is an anhydride of dicarboxylic acids or a mixture of these anhydrides which is liquid at temperatures below 40° C.

6. A curable composition according to claim 1, wherein component C) contains blocks derived from liquid butadiene acrylonitrile copolymers and difunctional polybutylene glycols or trifunctional or difunctional polypropylene glycols.

7. A cured product obtained by heating a curable composition according to claim 1.

8. A curable composition according to claim 6, wherein component C) is a segmented copolymer of the formula VI $$Z-[PAG-X_1BDC]_n-X_1-PAG-Z \qquad (VI)$$

in which n is an integer from 1 to 10, PAG is the radical of a difunctional polypropylene glycol or polybutylene glycol after the functional groups have been removed, BDC is the radical of a difunctional, liquid butadiene/acrylonitrile copolymer after the functional groups have been removed, each X$_1$ is a bridge group of the formula —CO—X— and/or —X—CO— or —Y—CH$_2$—CH(OH)—CH$_2$—O— and/or —O—CH$_2$—CH(OH)—CH$_2$—Y— in which X is —O—, —S— or NR$_1$—, Y is —O—, —S—, NR$_1$— or —CO—O—, R$_1$ is hydrogen, alkyl, cycloalkyl, aryl or aralkyl, and Z is a radical selected from the group consisting of

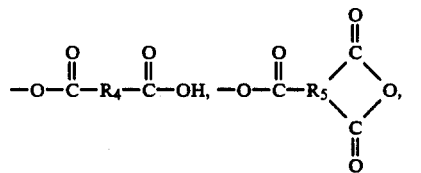

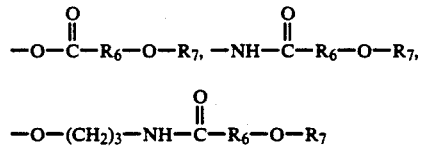

and —O—R$_7$, in which R$_4$ is the radical of an aliphatic, cycloaliphatic or aromatic dicarboxylic acid after the two carboxyl groups have been removed, R$_5$ is the radical of an aromatic tricarboxylic acid after the three carboxyl groups have been removed, R$_6$ is the radical of an aromatic hydroxycarboxylic acid after the carboxyl group and the phenolic hydroxyl group have been removed and R$_7$ is hydrogen or a group of the formula

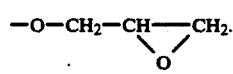

* * * * *